United States Patent [19]

Hutchins et al.

[11] Patent Number: 4,488,241
[45] Date of Patent: Dec. 11, 1984

[54] ROBOT SYSTEM WITH INTERCHANGEABLE HANDS

[75] Inventors: Burleigh M. Hutchins, Hopkinton; Louis Abrahams, Worcester, both of Mass.

[73] Assignee: Zymark Corporation, Hopkinton, Mass.

[21] Appl. No.: 355,349

[22] Filed: Mar. 8, 1982

Related U.S. Application Data

[63] Continuation-in-part of Ser. No. 328,727, Dec. 8, 1981.

[51] Int. Cl.³ ................ B23Q 3/155; G05B 19/42
[52] U.S. Cl. ................................ 364/513; 318/568;
 279/1 TS; 901/9; 901/17; 901/30; 901/31;
 901/32; 901/36; 901/41; 901/44; 901/45
[58] Field of Search .............. 364/513; 318/575, 599,
 318/568; 279/1 TS; 901/30-45

[56] References Cited

U.S. PATENT DOCUMENTS

| | | | |
|---|---|---|---|
| Re. 30,132 | 10/1979 | Irie | 364/513 X |
| 3,661,051 | 5/1972 | Dunne et al. | 364/513 |
| 3,920,972 | 11/1975 | Corwin, Jr. et al. | 364/513 |
| 4,011,437 | 3/1977 | Hohn | 318/568 X |
| 4,138,632 | 2/1979 | Pauwels | 318/599 |
| 4,243,923 | 1/1981 | Whitney et al. | 364/513 X |
| 4,281,447 | 8/1981 | Miller et al. | 279/1 TS X |
| 4,283,764 | 8/1981 | Crum et al. | 364/568 X |
| 4,362,978 | 12/1982 | Pollard et al. | 364/513 X |
| 4,383,245 | 5/1983 | Cooley et al. | 318/599 X |

Primary Examiner—Jerry Smith
Assistant Examiner—Allen MacDonald
Attorney, Agent, or Firm—Andrew F. Kehoe

[57] ABSTRACT

A robot system comprising readily interchangeable hands. Usually the system will be controlled by a computer which will communicate with servo motors in each hand through an analog pulse width generator on the robot. The computer controller will also be able to utilize robot-associated circuitry to obtain information directly from each hand.

7 Claims, 14 Drawing Figures

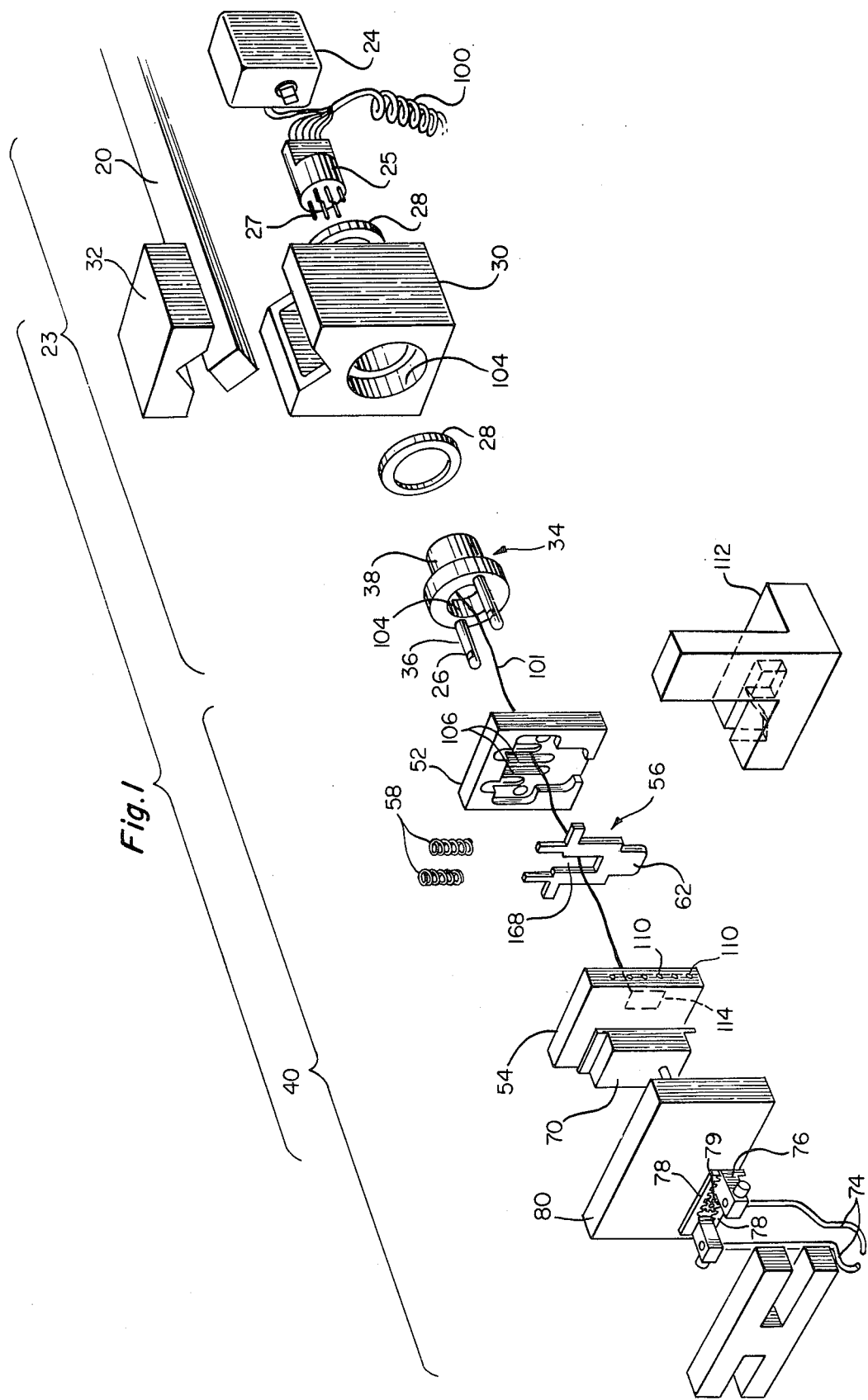

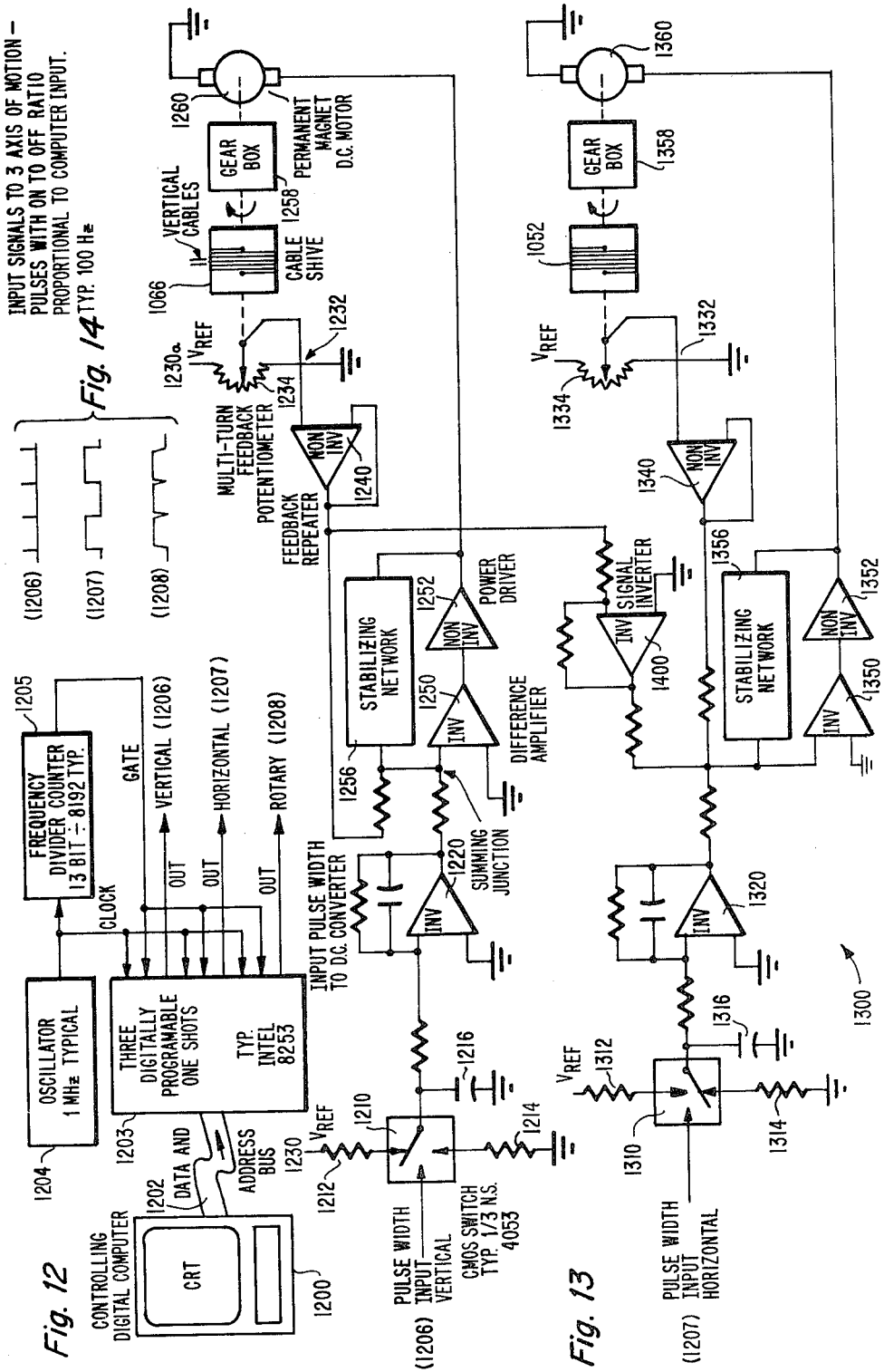

ROBOT SYSTEM WITH INTERCHANGEABLE HANDS

RELATED APPLICATION

This application is a continuation-in-part of expanding U.S. patent application Ser. No. 328,727 entitled Robot Tool System filed by Hutchins and Abrahams on Dec. 8, 1981.

BACKGROUND OF THE INVENTION

This invention relates to robot systems. The invention relates particularly to robotic systems wherein robot hands are connected, electrically and mechanically, to a robot arm and wherein the system comprises sufficient circuitry so that such hands may be interrogated and addressed through the robot control circuitry.

In the design of robots of the kind which perform a number of the manipulated operations of the type usually done by people, it is a major problem to provide an artificial hand which can manipulate the many shapes and sizes of devices that are so easily manipulated by the human hand. An example of this problem is seen in chemical laboratories wherein in such diverse tasks as removing and replacing screw caps on jars, operating syringes, and handling and pouring from many sizes of test tubes, each task requires a particular hand action.

In the past it has been the practice of robot engineers to place a great deal of emphasis on the design of expensive robot hands that can do all the functions to be required of a particular robot in a particular robot installation. This, indeed, was a logical attitude for an industry which has viewed itself largely as a labor-saving and automatic-processing service.

Nevertheless, thus, as will be described below, it has now been discovered that it is advantageous to provide a robot system which makes practical the use of a variety of robot manipulators with the same robot.

SUMMARY OF THE INVENTION

Therefore it is an important object of the invention to provide a robot system which comprises a number of hands which are readily connectable, both electrically and mechanically, and in a facile and automatic manner, to a robot arm.

A principal object of the invention is to provide communication means from a central control unit to and from said hands to optimize the potential value of using a plurality of manipulators on a single robot system.

Further objects of the invention are to provide improved means to generate and utilize analog signals to servo-motors mounted on said hands.

Another object of the invention is to provide a robot system comprising circuitry, or even microprocessors, on a plurality of exchangeable manipulators having circuitry which can communicate with said robot system directly through the robot unit itself.

Other objects of the invention include providing improved robot hands and, particularly, process hands which can be interrogated and/or programmed by communication to and from a remote control system and robot hands that are readily interchanged by automatic latching means onto a robot arm.

Other objects of the invention will be obvious to those skilled in the art on their reading of the present specification.

The above objects have been substantially achieved within the context of a robot system of the type suitably operated by a computer controller and having an arm responsive to said computer control means and adapted to carrier manipulator means. A data microprocessor unit is incorporated into the robot design for receiving and transmitting signals to the computer control means. However, said microprocessor also comprises means to receive and send data to said manipulator means, i.e. to hands attached to the robot. Some signals sent to circuitry in the hand are advantageously an analog signal for the operation of at least one servo motor or like direct current-operated apparatus.

Those skilled in the art of robot operation will readily understand that any number of computer configurations can be utilized to operate the apparatus of the invention. When the term "controller" is used in this application, it means whatever control apparatus whether it be a relatively large computer like a Digital Equipment Company's PDP-11 series, or a more specialized computer control system developed for a particular robot system, or like date processing systems.

In the preferred configuration of a robot system of the invention, the robotic arm mechanism is within reach of one or more stations where a plurality of hands are held ready for automatic attachment to the arm. Each arm and the robot are operated with a central computer control with the desired, i.e. any suitable programming procedure.

In general each hand and the robot will have a programmed module plugged into the central computer comprising an important part of the central computer coding for the hand or robot control procedures. However, to enhance their mobility, the hands (or other implements mounted on the robot arm) are believed to be best freed of a direct cable connection to its specific programmed module plugged into the central controller, i.e. what is usually a central computer.

Thus connections from the computer to the hands are run through each module that may hold a hand, i.e. such as a robot module requiring a hand on the arm thereof.

A particularly important aspect of the invention is to have the hand interconnected through the robot control. In many situations, well illustrated by the example of pouring into a small test tube from another test tube, the robot arm will want to move while the hand pours to keep the pouring outlet above the receptacle.

In the robotic system, the central intelligence is provided by a computer which is designed to accept plug-in modules carrying code and instruction for the robot, for each hand, and so forth.

Various modules can be inter-related in the central computer.

The advantage of having the plug-in program associated with the implementation of each module is that as needs for new robotic procedures arrive, new modules can be designed and used in the existing computer system, without the pre-existing system or the other modules associated being modified or obsoleted.

It will be understood that the invention is primarily related to the art of control and exchange of a plurality of manipulator hands, i.e. apparatus carrying servos intended to perform manipulative functions. However, applicants point out that, once having conceived the value of a plurality of intelligent manipulators they have extended the concept to other tools.

Thus, in the case of a machine tool, say a drill, it is possible to achieve some excellent advantages using some of the aspects of the present invention, particularly those relating to interrogation of a quick-releasable mechanism. Thus in the case of a drill, it is possible to incorporate a variable transducer that will generate a signal representative of the torque encountered which signal may be used for such functions as confirming the suitability (or warning of the non-suitability) of the hardness of a material, e.g. a specific metal being processed, the condition of a tool with respect to wear, and the conformance of the size of the tool grasped to the tool intended to be grasped.

The preferred mode of the invention is to use lightweight servo motors because they are most versatile of the small control motors. However, in many applications, stepping motors may be used rather than servo motors.

In some applications stepping motors will be desired because of their non-spark characteristics or low cost or because no other analog-signal is required and one can dispense with the circuitry specifically used for analog signals purpose, replacing them with less complex stepping motor circuitry. As will be seen in some embodiments of the invention, it is desirable that a microprocessor in the robot system comprises a programmable counter forming means to generate an analog pulse width for transmission to said manipulator.

ILLUSTRATIVE EXAMPLE OF THE INVENTION

In the application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

FIG. 1 is an exploded view of one tool assembly/robot connector combination of the invention.

FIG. 2 shows the position of the latch when locked on a robot connector assembly.

FIG. 12 is a schematic diagram indicating a preferred way of generating pulses for the motor circuits.

FIG. 13 is a circuit diagram indicating a preferred way of controlling vertical and horizontal motors.

FIG. 14 is a schematic diagram illustrating input signals of various pulse shapes.

Figure 3:
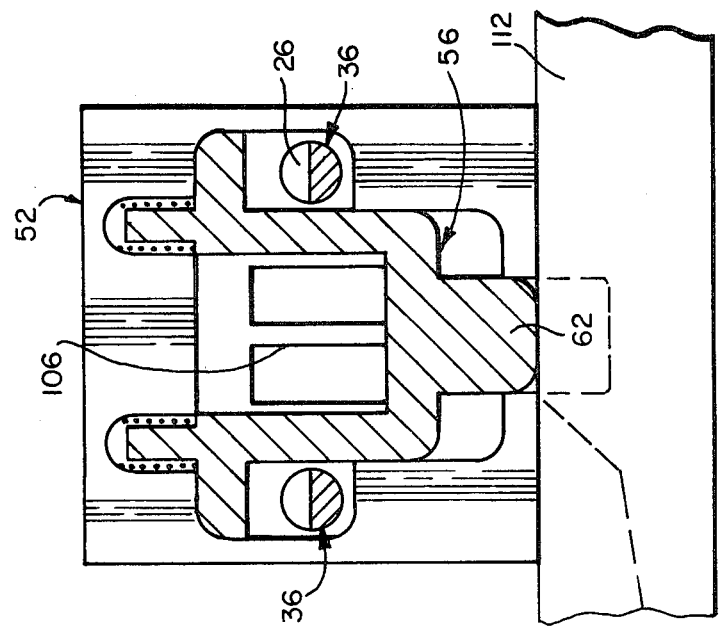
FIGS. 2 and 3 are views in elevation of a latch mechanism used in apparatus of FIG. 1.

Referring to FIG. 1, it is seen that an arm 20 of a robot apparatus has a robot connector assembly, in this case a wrist assembly, comprising a servo motor 24 for imparting a wrist-like motion to an electrical terminal member, a rotary pin plug, 25 carrying a plurality of electrical prongs 27. Member 25 fits snugly with thrust bearing 28 into lower wrist block member 30. Member 30 is clamped to robot arm 20 by upper wrist block member 32 with fasteners, such as screws. (In general, such commonplace fasteners are not shown in these drawings because their presence and use will be known to those skilled in the art.)

The robot connector member 34 of the wrist assembly comprises connector means comprising two tines 36. Connector member 34 comprises a sleeve 38 which also fits into lower wrist block 30 abutting against the face of terminal 25 and forming means to protect prongs 27 which protrude, when the robot connector assembly is completed, into sleeve 38. It is wrist member 34 which is ultimately rotated within the wrist block formed of members 32 and 30, by servo 34 to provide wrist action. Prongs 27 each comprise a locking groove 26 which forms means to lock into the tool assembly.

FIG. 1 also shows a tool assembly 40 which is adapted to be attached to robot connector assembly 23 by a unidirectional thrust of tines 36.

Figure 2:
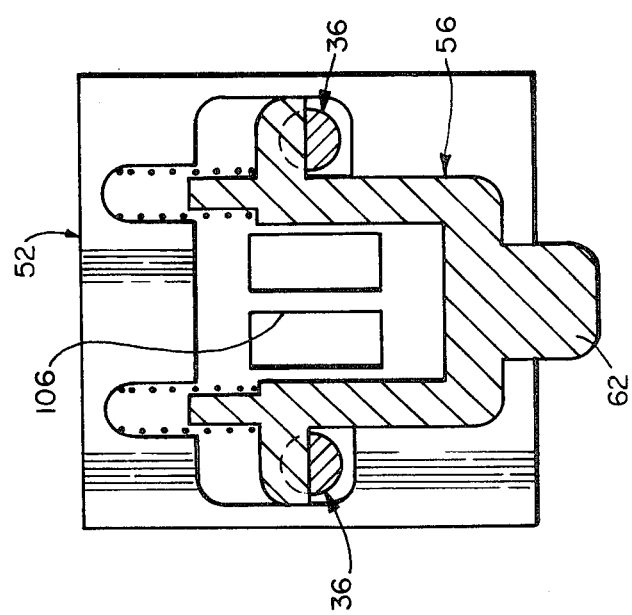
Figure 4:
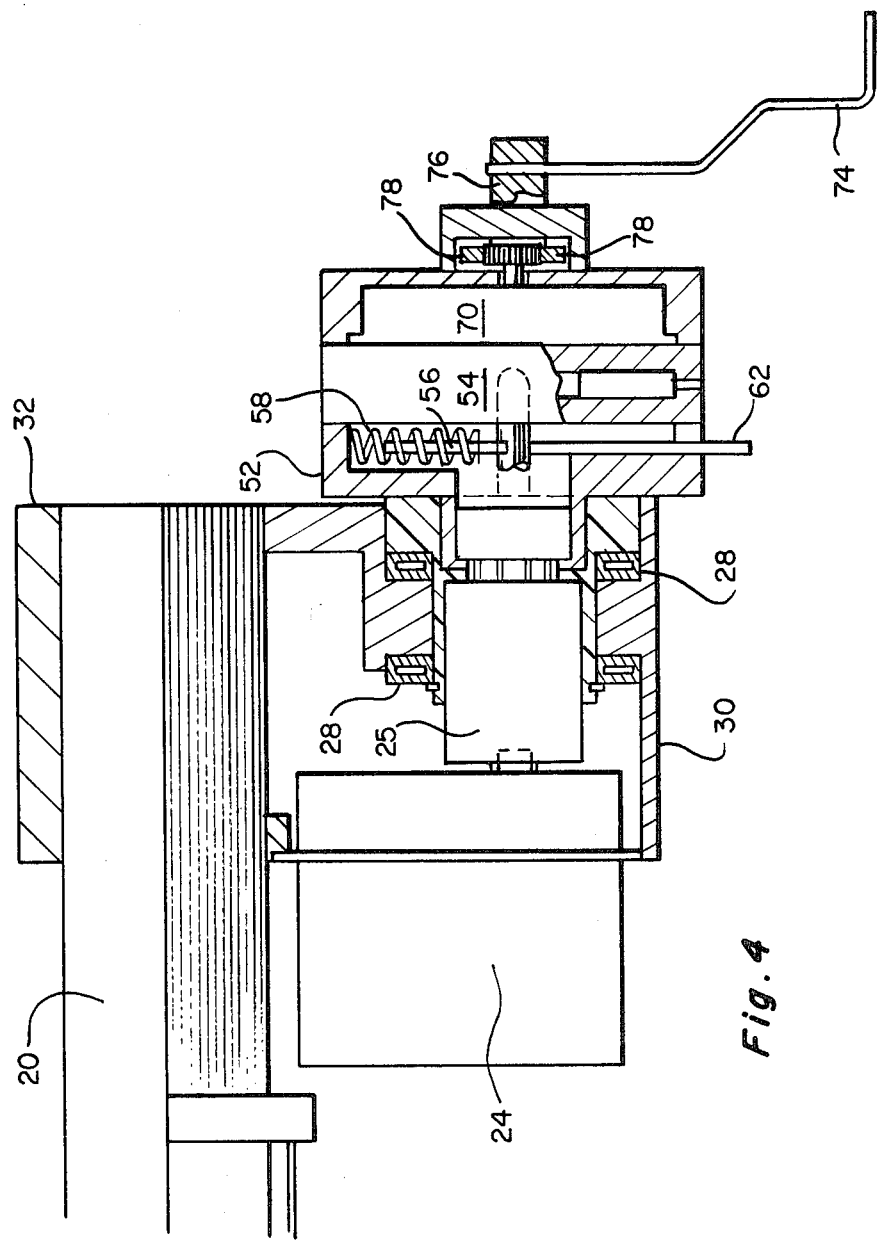
FIG. 4 is a view of the apparatus of FIG. 1 in assembled form.

Tool assembly 40, in this case a device adapted to pick up a test tube, comprises a lock or latching system, which is best seen in FIGS. 2 and 3, and which is held within a latch housing member 52 and a servo mounting terminal plate 54. Latching system comprises a latch member 56 which is held in open (up) position by virtue of the sub-assembly being held in a track on rack 112. A locking bolt 62 is pushed up by engagement with the ramp of the track to maintain this position until tines 36 enter the apparatus, pull it off sideways and allow the springs to lock the tines by pushing latch member 56 downwardly into the locking groove 26 of the tines. At this point the robot connector sub-assembly will be firmly clamped onto the tool assembly, the structure of which is completed by a tool servo motor 70 operably connected to a tool or hand comprising a gripping means 74 mounted on brackets 76 which ride back and forth in the gear teeth of upper and lower racks 78 as those racks move in response to rotation of a rotary gear 79 on the servo shaft which rotates through an aperture in tool backplate 80.

It is to be particularly noted however that the tool itself advantageously sits in a tool holder and is secured therein by bolt 62.

Also it is to be noted that, advantageously, the servo motor plate comprises electrical conductor means which provide means to send or receive electrical signals through either the robot or the tool rack depending upon where the tool is at a given time.

Electrical connections from and to the apparatus can be made in a number of convenient ways. However, normally signals will be transmitted and received through multiwire conductor 100 which is connected to rotary pin member 25 and servo 24. Thence connections can be made through a central conduit 104 in the wrist member 34, through slots 106 in lock housing member 52 and opening 168 in latch 56 to servo motor 70. Also, there may be terminals 110 from the terminal mounting to a rack member 112 which, for example, is adapted to read a read only circuit, conveniently a memory chip 114, within the member 54 giving information about the tool members condition. In the simplest case the chip or circuit can carry a message as simple as "I am here on the rack" or "I am here locked properly on the robot". Such simple switching and coding is well within the skill of those in the art. In fact, with ROM chips, it is also convenient to communicate information relating to other conditions including whether the device has been cleaned, whether it is wet or dry, hot or cold, etc. Very light servo motors, typically those used in model aircraft such as those sold by Kraft Systems, Inc. under the trade designation KPS-12 and KPS-16, are useful in many of the applications of the present invention, including in the illustrated embodiment of the invention.

With the foregoing description of a typical robot hand and how it can be readily and automatically attached and disengaged from a robot arm, it will be clear to those skilled in the art how many different removable hand configurations may be constructed to utilize a servo motor in combination with a conventional mechanical motion-translating means such as a cam, or a rack and pinion, or any collection of gears or pistons, to operate a hand which squeezes, pushes, pulls, turns, etc. Below, we will describe some specific control circuitry which can be used with such hands. In general, this type of circuitry is so small that it can be incorporated into or placed upon a specific hand without any mechanical or spatial problems.

Electrical connections are readily made with the hand through the robot as described above.

Figures 5, 6, 7:
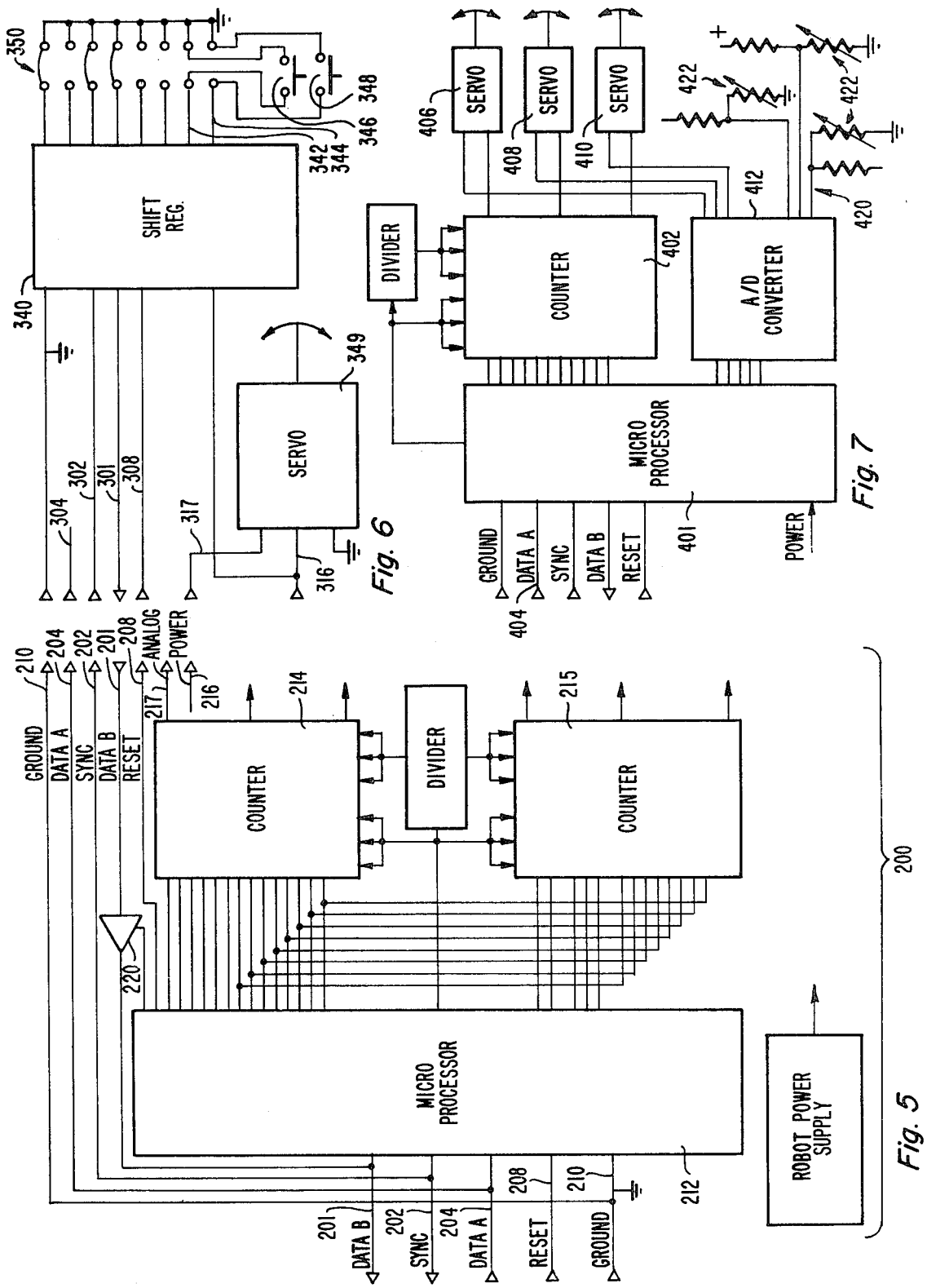
FIG. 5 is a schematic circuit diagram illustrative of a microprocessing circuit associated with a robot assembly and adapted to receive and send data to a computer controller and to the hand circuitry of FIGS. 6 and 7.
FIG. 6 is a schematic circuit diagram illustrating a microprocessing system which, in connection with the circuitry of FIG. 5 and a central computer is utilized to operate a manipulator or hand.
FIG. 7 is a schematic diagram illustrating a microprocessing system which, in connection with the circuitry of FIG. 5 and a central computer, is utilized to operate a more complex manipulator hand.

Referring to FIG. 5, it is seen that a five-wire connection, generally known to the art, is made to the central computer controller (not shown because any controller comprising sufficient memory and logic can be used in the process of the invention). The five wire connection comprises:

A line (Data B) 201 for carrying signals from the robot or hand to the central controller, A so-called "SYNC," or synchronizing line, 202, A line (DATA) 204 carrying data from the controller to the robot system, A RESET line 208 providing means for the controller to restart any peripheral device such as any hand, and a ground line 210.

A microprocessor 212 such as an Intel 8748 is connected to interface computer commands through a robot control system 200, that is primarily based on use of an Intel 8253 programmable interval timer, i.e. counter 214 and 215, used as an analog pulsewidth generator for operating the placement of the servo hand.

Microprocessor 212 is utilized to operate a field-effect switch 220, conveniently a Motorola 4053 field effect switch 220, to turn on and off the DATA B line from a hand such as the hand shown in FIG. 6. Without such a switch the hand of FIG. 6 would tend to burden some control systems by sending data through line B when no data was needed.

In the present application, before the computer sends a command to the robot (or any other manipulator device) it will usually receive an identifier signal through line DATA B which directs the signal, via the 4053 when required, to the intended receiver, i.e. to the central computer.

Such a computer command may direct any action by the receiver, including the transmission back to it of data or of status. Indeed, in the more complex embodiments of the invention (e.g. as shown in FIG. 7), the receivers, i.e. the manipulators, will never send messages that are not first requested by the computer.

It will be seen that the system allows the hand circuitry to communicate with the computer through some of the same lines that provide communication between computer and robot arm.

The circuitry for hands shown in FIGS. 6 and 7 differ substantially in complexity. FIG. 6 relates to a simple robot-controlled task, one suitable for use with a manipulator that requires only a single squeeze or push from a servo-motor. The control circuit to the hand of FIG. 6 comprises seven lines, four (302,304,308, and 301) which connect to the corresponding inlet lines 202,204,208, and 201.

The Data B line 201 communicates through the field-effect switch with the microprocessor 212. The reset function is controlled through line 308 through microprocessor 212. In addition to these five lines, the circuitry of FIG. 6 has a d.c. analog servo imput signal fed into a servo motor via lines 217 and 317. Power is supplied through lines 216 and 316. It is to be noted that those skilled in the art need only to read the disclosure to understand that power must be supplied to the various operating units and it is well known in the art to make such connections.

Line 217 is optional in implementation of the invention, but in many cases use of such a line will allow a cost reduction in those hands that have only one motion and no feedback to the controller except relatively simple on-off feedback such as is obtained from the above-described switch function wherein switch 220 will be operated through a command to the robot processor from the control computer.

As seen in FIG. 6, the circuitry carried on a simple manipulator advantageously comprises a shift register 340 (suitably a National Semiconductor MM 54C 165) for transmitting identity data or like information. Two status (or output) bits 342 and 344 are assigned. These report the on-off position of switches 346 and 348 respectively. The switches themselves can be actuated by any parameter such as temperature (from a thermister) or mechanical position of a hand clamping member.

Servo motor 346 can be utilized to open or close a clamping member, to turn a wrist or provide any other such action desirable from the hand.

The jumpers 348, in any desired arrangement on the output string of register 340, provide means to report the identity of the particular hand and hand circuit (or other status data) back to the central computer control mechanism.

Thus when power is applied to the shift register 340 and the reset signal is removed, the register is stepped through its cycle by clock pulses through the sync line, thereby generating a series of output signals via the Data B line to the central computer that reflect input signals from the switches and encoders 346, 348 and 350. These clock pulses will normally be continued in a repeated sequence or pattern until data line B is reset by the computer through switch 220 and the microprocessor 212. FIG. 7 illustrates circuitry useful with a more complex and general purpose hands connectable to the same robot arm as is the circuitry of FIG. 6. In the hand of FIG. 7, the communications lines from the computer and robot microprocessor 212 are connected to the pins of a single chip microprocessor 401, such as an Intel 8748. The 8748 is an 8-bit microcomputer with RAM, ROM, with an EPROM therein.

When power is applied and the reset removed, the processor monitors the "Data A" line 404 (which is connected to line 204 from the central computer). Instructions received from the computer instruct pre-programmed microprocessor 401 to operate (through a programmable interval timer 402 which is suitably an Intel 8253) the various hand functions which are identified as three distinct servo functions (e.g. to squeeze, twist and pour) by three different servo motors 406, 408, and 410.

In the circuit shown, the servo motors are both operated and monitored for the completion of the instructed motion through the six-channel analog to digital converter 412. This is conveniently a Motorola analog signed to pulse width converter of the Motorola 14447 type.

It is to be noted that the number of analog signals available for use exceeds that necessary for running servo motors thereby providing means for receiving data through line 420 from variable transducer means 422, such as, for example, photo-responsive (photovoltaic) meters, conductivity-sensitive meters, thermometers, and the like.

A primary distinction between the preferred operation of the hands driven by circuits in FIGS. 6 and 7 is that, preferably there is no transmission of data at start-up. The hand circuitry waits for a request for specific data.

Thus it is seen that such hand manipulating apparatus as schematically shown in FIGS. 5 and 6 can be readily integrated into the robot-borne circuitry and incorporated into the quick connect and disconnect apparatus of the type shown in FIGS. 1–4.

In the above description, pin numbers have been designated where they are thought to be helpful in showing the mode of connection of various microprocessors. Redundant designators have not been shown where they relate to a mode of use shown elsewhere in the drawing or where they are considered to be within the skill of those knowledgeable in the design and use of microprocessor components.

A CRT-process controller component 805 assigns different addresses, after polling its memory including, particularly, all the plugged in modules, including hand module 810 robot module 820. In general the plug-in module comprises ROM, RAM, I/O and address registers, all as is appropriate to achieve whatever function is desired. In any event, the address is assigned in view of the RAM and ROM-bearing information of the modules.

Figure 8:
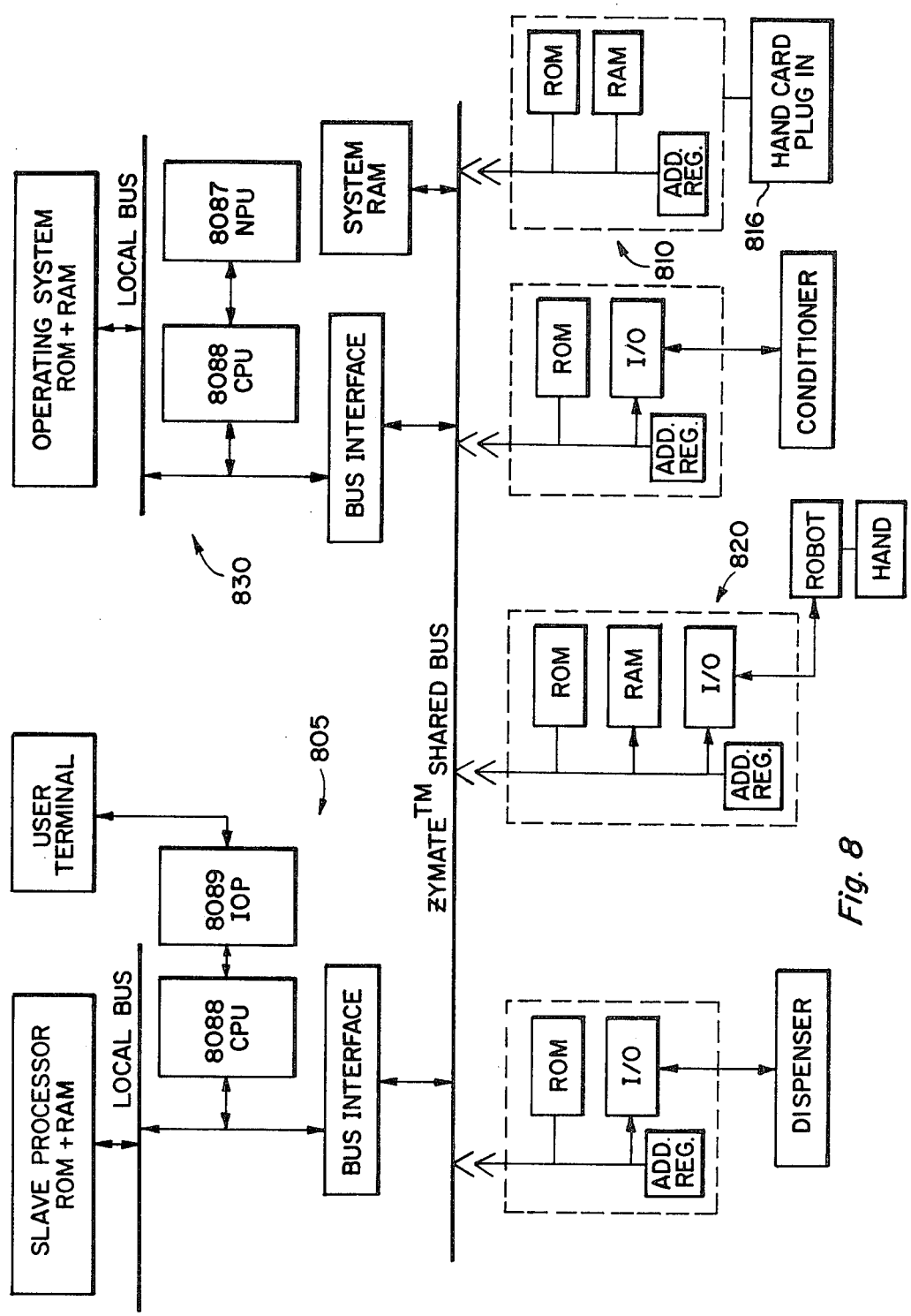
FIG. 8 is presented to give an idea of one advantageous computer architecture for use with the present invention.

Each module, at the time it is being serviced by the central computer preferably will indicate how frequently (i.e. when next) it wishes to be serviced and, thereupon, obtains, in system control section 830 of the computer, the time and servicing schedule which it requires. Section 830 comprises sufficient computing capacity and coding to resolve conflicts between various modules assigning appropriate priorities. In this way the system operates on a self-conforming code basis, ready to accept more information from new plug-in modules and to make that information conform to the other demands made on the system. The shared bus arrangements shown in FIG. 8 are helpful in achieving this self-conforming code.

Although the particular robot structure and control method which is used in conjunction with the automatic hand-changing apparatus of the invention is not critical, it is believed that the apparatus described in FIGS. 9 through 14 describes a robot apparatus and control system which is of particular value.

Figure 9:
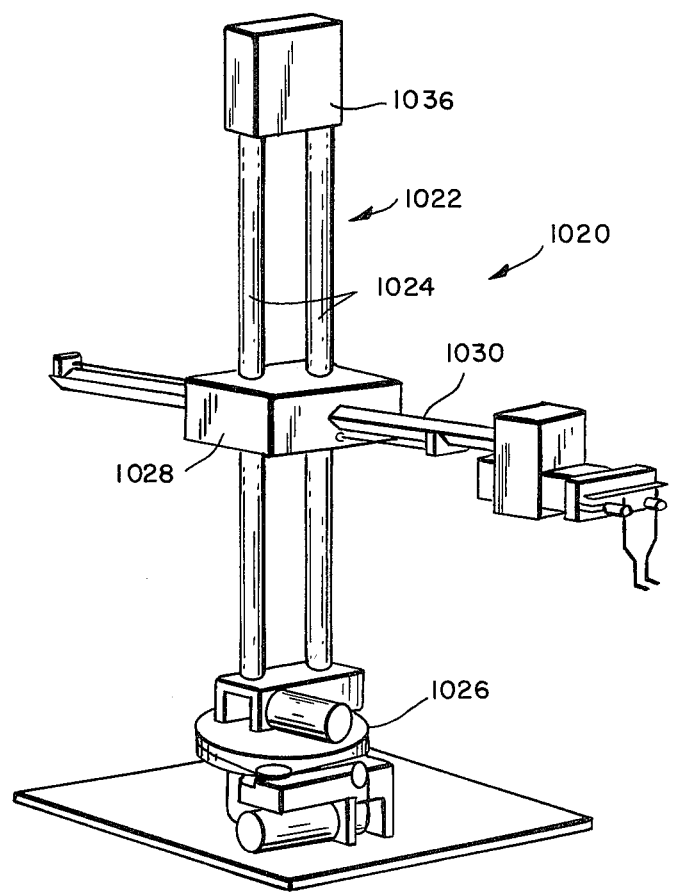
FIG. 9 is a perspective view of a robot constructed according to the invention.
Figure 10:
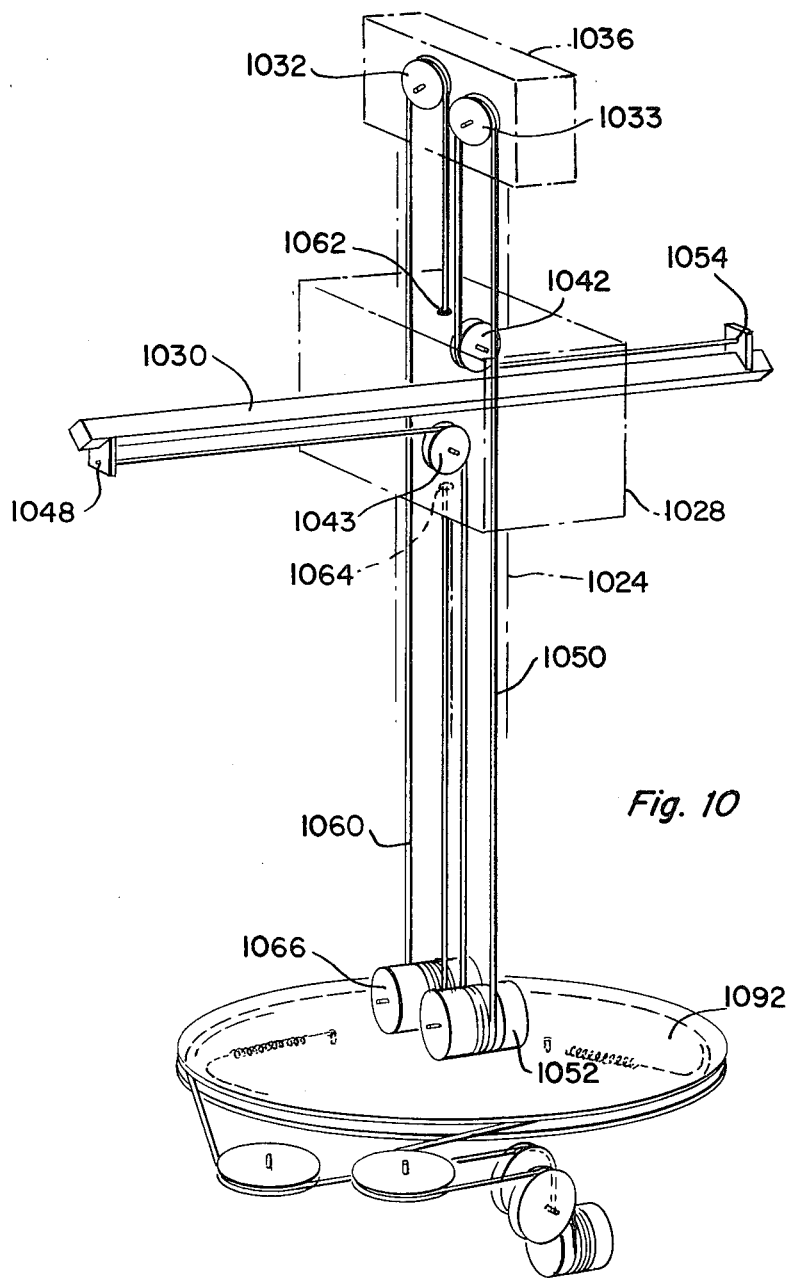
FIG. 10 illustrates a cable diagram indicating the relative position of cables, winches and pulleys in the apparatus.

Referring to FIGS. 9 and 10, it is seen that robot 1020 comprises a vertical track 1022 formed of hollow vertical track rods 1024, and a turntable 1026 which provides means to rotate vertical track 1022 about a 360 degree arc.

Mounted for movement up and down along track 1022 is an arm-bearing bracket 1028 which, in addition to apertures for rods 1024 comprises a diamond-shaped aperture for passage of arm 1030. Arm 1030 rests on four sets of roller bearings mounted on the lower surfaces of the passage and which are not shown but are conventionally used in the mechanical arts and is adapted to be moved back and forth through bracket 1028 on the roller bearings.

Motion is impacted by three motor-driven cable systems, each of which comprises a length of cable, pulleys or sheaves for facilitating the movement of said cable, biasing means for maintaining desired tension on said cables and a winding means for the cable operation. (See FIG. 10.) In each case, the winch is mounted between the ends of the cable which it is moving so that movement of the winch (about which are wound several windings of cable) pulls one end of the cable while feeding out the cable demanded by the integrated movement being imparted to the robot arm by the sum of the action of all three cable/winch systems.

Upper pulleys 1032 and 1033 for the cable system are housed in an upper housing bracket 1036. Pulleys 1042 and 1043 for horizontal arm movement are housed within cavities of the central bracket 1028.

Cable 1050 is the operating cable for moving arm 1030 in and out of bracket 1028. One end of the cable is attached to the arm 1030 near each end thereof. Cable 1050 feeds from an initial anchoring position 1048 back over pulley 1043 downwardly around the horizontal, or arm-operating winch 1052, around the winch for several turns thence upwardly to pulley 1053, downwardly to pulley 1042 and back to its terminal anchoring position at 1054. The anchoring positions are selected to assure they will not engage the pulley or pulley-holding bracket during the desired travel path.

Similarly, bracket 1028 is itself carried in a vertical direction in response to the movement of a cable 1060 which is attached to the bracket at anchor positions 1062 and 1064. Rotation of winch 1066 will cause the cable to carry the up and down tracking rods 1024.

Each combination of motor, gear box, winch, and potentiometer is assembled so that the individual parts rotate together. Thus, referring to FIG. 11, it is seen that the turntable motor 1080 is aligned on a common shaft with gear box 1082, winch 1084 and potentiometer 1086 below turntable 1090 which comprises a rotary mounting plate 1092 and a grooved circumference for receiving turntable cable 1062.

Figure 11:
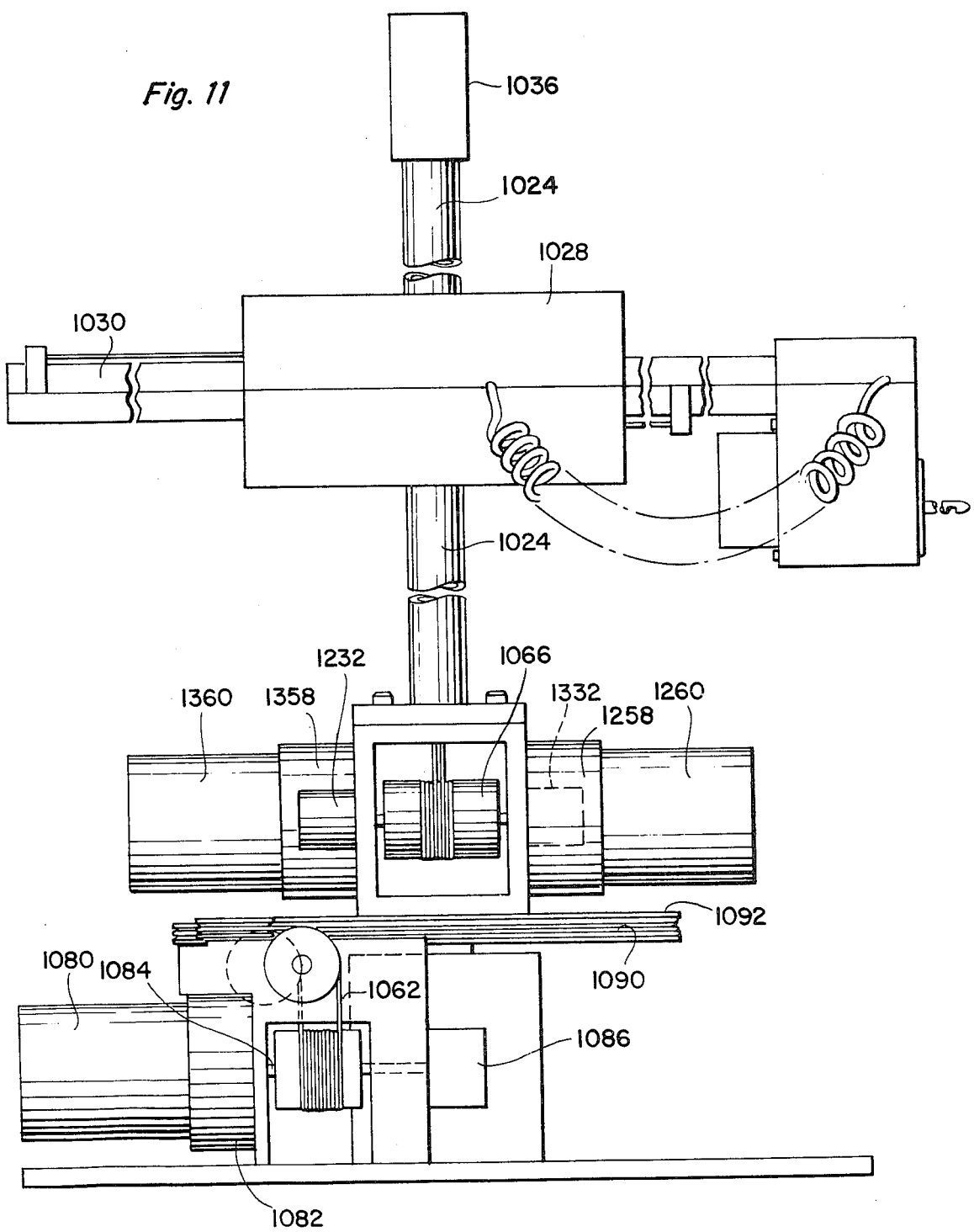
FIG. 11 is a somewhat schematic elevation of the apparatus of the invention indicating the relative position of the motors and principal robot member.

Also seen in FIG. 11 and numbered to correspond with FIG. 13, are the horizontal, or arm, motor 1360, its gear box 1358, its winch 1052 (hidden), and its potentiometer 1332. Also seen on FIG. 11 are the vertical control motor system comprising vertical motor 1260, its gear box 1250, its winch 1066, and its potentiometer 1232.

Winch 1066 is connected, on a common shaft, to turn with a multiturn potentiometer 1232 (described below) and gear box 1258 of motor 1260.

Likewise winch 1358 is connected on a common shaft to turn with a multiturn potentiometer 1332 and gear box 1358 of motor 1360.

The illustrated cable arrangement is of particular value in tying in the horizontal and vertical movement of the arm by having each anchored to the bracket 1028. In this arrangement, for example, the arm will move horizontally when the block moves downwardly unless, of course, horizontal movement counteracts the effect. This interacting cable arrangement facilitates a smooth control of the robot as will be described below.

FIG. 13 describes the operation of the motors. Specific detail is set forth only for the horizontal and vertical motors which can interact to assure desirable tracking characterisics for the robot arm. It will be understood that the turntable motor can be driven by a similar circuit.

The circuit described as FIG. 12 has as its object the generation of three modulated, pulse-width signals for vertical, horizontal and rotary motion of the robotic arm.

Any appropriate controlling computer 1200 is connected through a standard buss interface 1202 to a series of three digitally programmable one-shot multivibrators. An example of a device readily utilized for this function is a programmable interval timer 1203 sold by Intel Corporation under the trade designation Intel 8253. This device is well known in the art and its use is described, among other places, in Intel Corporation's publications entitled "The 8086 Family User's Manual" (October 1979) and "Component Data Catalog" (January, 1981). (However, it is not believed that the precise use described herein is disclosed anywhere in the prior art.)

An oscillator 1204 is connected to the clock inputs of the one-shots has a frequency of about 1 megacycle. (However it should be realized that the frequency could be up to the maximum count rate of the particular one-shot. Lower frequencies could be used but this is generally undesirable. Such lower frequencies will cause reduction in resolution or a reduction in the frequency of the pulse rate modulated signal outputs.)

The one-shots generate a pulse which is proportional to their digital inputs up to a maximum value permitted by the frequency divider counter 1205 which is suitably of thirteen binary bits or a count of 8192 decimal.

The percentage of "on" time (as opposed to "off" time) of the output pulses from the one shots of timer 1203 is proportional to the input digital data and the frequency of the output is equal to the oscillator frequency divided by the frequency of the divider counter. These signals are sent over a transmission line from the computer to the robotic arm-operating mechanisms as shown schematically at 1206, 1207 and 1208. This has the advantage that the information component of the signal is in the time domain and is not directly dependent upon the voltage levels or voltage drop in the cable. Typical useful pulse width inputs profiles are shown in FIG. 14. These inputs cause a change-of-state of a C-MOS switch 1210, typically a National Semiconductor Model No. 4053, which switches the output from voltage reference to ground through a pair of resistors 1212 and 1214. This switching is smoothed by capacitor 1216 followed by an integrating amplifier 1220 whose time constants, together, filter the AC component out of the pulse-width-signal.

It is well to note that the reference voltage (at 1230) to the C-MOS switch 1210 is the same as the reference voltage (at 1230a) to the feedback potentiometer 1232. This is the potentiometer associated directly with motor and winch. Thus the input signal becomes independent of voltages generated other than the reference voltage. Moreover, because the input switch (1210) and feedback potentiometer (1232) both ratio the reference voltage, that voltage is not itself critical except that there be no substantial difference between the reference tied to the input switch 1210 and the feedback potentiometer. Tracing the signal from potentiometer 1232, the wiper 1234 of potentiometer 1232 is connected to a feedback repeater amplifier 1240 which forms means to minimize or reduce the effect of loading on the potentiometer 1232. (A load resistor connected across the potentiometer would normally cause a nonlinearity of the feedback signal, i.e., a undesirable difference between the feedback signal and the actual position of the potentiometer.) The feedback voltage is then summed together with the input voltage which is of opposite polarity. The difference in feedback and input voltages is suitably amplified in difference amplifier 1250.

The amplified signal is sent to powerdriver 1252 which generates the necessary voltage to drive the permanent magnet direct current motor that moves the "vertical" servo drive mechanism 1260. The stabilizing network 1256 which is connected from the motor input back to the summing junction prevents oscillation of the total system. Use and design of such stabilizing networks is well known in the art.

The vertical drive gear box 1258 has a relatively high gear ratio which increases the lifting force yet, at the same time, limits the vertical speed of the motor which causes the vertical lift and, thus, limits the speed of the robot arm lift motion. This has the advantage of allowing the horizontal servo 1334–1360 system to track the position of the vertical motion with minimum error and provides for the force necessary for the vertical servo to lift a large mass.

The direct current motor 1260, the gear box 1258, the cable pulley 1066, or sheave, and the multiturn feedback potentiometer 1232 are connected to a common shaft. Thus the position of the vertical motion is locked directly to the motor 1260 and the feedback potentiometer 1232.

Referring to FIG. 13, showing the processing of the pulse width input to the horizontal drive control system (1300) goes through the same process of being switched from reference voltage to ground through the resistances that are in series with those leads and is smoothed by the integrating inverting amplifier 1220 as in the vertical motion circuitry. The resulting D.C. voltage is summed together with the feedback from the horizontal feedback potentiometer 1334 along with a signal that is inversely proportional to the feedback signal from the vertical feedback potentiometer 1232 through a signal inverting potentiometer 1400. This signal causes the horizontal servo 1360 to closely track the position of the vertical servo 1260 allowing the cable system controlling the arm to be of simple construction. When the arm is raised, the horizontal cable 1060 must be moved exactly synchronously with it to provide that a tool mounted on arm 1030 to move directly upward. The inverse is true when arm 1030 is to be moved in a downward direction. To accomplish this, the horizontal gear box 1358 has a lower gear ratio allowing higher speeds in the horizontal direction and, hence a faster response than is provided by the vertical gear box 1258. This is permissible and convenient because horizontal arm 1030 does not need to lift mass.

Thus forces generated on the cable and sheave will be suitably low despite the relatively rapid movement of the arm in a horizontal direction. The horizontal stabilizing circuitry, of course, will be optimized for the different speed. This stabilizing is within the ordinary skill of the art.

It is also to be understood that the following claims are intended to cover all of the generic and specific features of the invention herein described and all statements of the scope of the invention which might be said to fall therebetween.

What is claimed is:

1. In a robot system comprising a robot arm permanently attached to said system, and (a) computer control means to control said robot arm and wherein (b) said robot arm is powered responsive to said control means and (c) manipulator means attached to said permanent robot arm, the improvement wherein said robot system comprises means for automatically attaching and detaching said manipulator means from said arm under computer controlled action of said robot system wherein said computer means comprises means to send data to said manipulator means through said robot, including data for operation of at least one control motor on said manipulator means, and to receive output data from manipulator means.

2. Robot system as defined in claim 1 wherein said robot system comprises a microprocessor for receiving and sending signals received between said manipulator and said computer control means.

3. A robot system as defined in claim 2 wherein said microprocessor is utilized in conjunction with a programmable counter means for generating analog pulse-width for transmission to said manipulator means.

4. Robot system as defined in claim 1 wherein said microprocessor and an analog pulse width generator form means to control the motion of said robot arm and means to control a servo motor in said manipulator means.

5. A robot system as defined in claim 1 wherein said robot arm comprises electrical and mechanical connecting means to receive and release a plurality of different manipulator components.

6. A manipulator having means thereon to automatically connect and disconnect to an arm of a robot, said manipulator means bearing at least one control motor and also bearing circuitry forming means to operate said motor and means for achieving at least one of the following functions:
   (a) identifying said manipulator means;
   (b) providing a signal from a transducer which signal is convertible into a computer-readable digital signal;
   (c) identifying a condition of said manipulator through a servo input signal, operable through an on-off switch means which is, in turn, adapted for operation from a control computer.

7. A manipulator as defined in claim 6 wherein at least one central motor is a servo motor and comprising means to provide an analog signal to operate said motor.

* * * * *